United States Patent
Finn et al.

[11] Patent Number: 6,067,235
[45] Date of Patent: May 23, 2000

[54] PROCESS AND A DEVICE FOR THE PRODUCTION OF A TRANSPONDER UNIT AND A TRANSPONDER UNIT

[76] Inventors: David Finn, König-Ludwig-Weg 24, Pfronten, D87459, Germany; Manfred Rietzler, Am Aiserberg 10, Marktoberdorf, D-87616, Germany

[21] Appl. No.: 08/913,751
[22] PCT Filed: Mar. 7, 1996
[86] PCT No.: PCT/DE96/00400
§ 371 Date: Sep. 22, 1997
§ 102(e) Date: Sep. 22, 1997
[87] PCT Pub. No.: WO96/29618
PCT Pub. Date: Sep. 26, 1996

[30] Foreign Application Priority Data

Mar. 22, 1995 [DE] Germany .......................... 195 09 999

[51] Int. Cl.[7] .................. H04B 1/59; A61B 5/07
[52] U.S. Cl. .................. 361/814; 361/760; 343/788; 340/572.8; 340/573.1; 29/601; 29/605
[58] Field of Search .................. 361/814, 760, 361/782, 783; 336/65, 192, 200; 343/788; 342/51; 340/572.1, 572.5, 572.8, 573.1, 573.2; 333/185; 455/66, 344, 347, 351; 29/601, 602.1, 604–606; 128/899

[56] References Cited

U.S. PATENT DOCUMENTS

| | | | |
|---|---|---|---|
| 3,523,251 | 8/1970 | Halstead ................................. | 343/872 |
| 4,939,623 | 7/1990 | Equi et al. ................................ | 336/65 |
| 5,025,550 | 6/1991 | Zirbes et al. ............................. | 29/605 |
| 5,050,292 | 9/1991 | Zirbes et al. ............................. | 29/605 |
| 5,164,737 | 11/1992 | Murray et al. .......................... | 343/788 |
| 5,223,851 | 6/1993 | Hadden et al. ......................... | 343/788 |
| 5,281,855 | 1/1994 | Hadden et al. ......................... | 340/573.3 |

FOREIGN PATENT DOCUMENTS

| | | |
|---|---|---|
| 43 07 080 A1 | 9/1994 | Germany . |
| 8 503 166 | 6/1987 | Netherlands . |
| WO 92/15105 | 9/1992 | WIPO . |

OTHER PUBLICATIONS

PCT International Search Report, Jul. 17, 1996.

*Primary Examiner*—Leo P. Picard
*Assistant Examiner*—John B. Vigushin
*Attorney, Agent, or Firm*—Darby & Darby

[57] ABSTRACT

A process and a device for the production of a transponder unit (11) comprising a coil (13) and at least one electronic component (23, 24), such as a chip or the like, wherein the component (23, 24) is connected to the coil (13) directly or via a substrate (14), with a plurality of process phases in which the equipping of a winding tool (40) with a substrate (14), winding of the coil (13) in the winding tool (40), and connection of winding wire ends (21, 22) of the coil (13) to terminal surfaces (17, 18) of the substrate in the winding tool (40) take place in such manner that the winding tool (40) serves as operating platform in all of the aforementioned process phases.

3 Claims, 6 Drawing Sheets

PROCESS AND A DEVICE FOR THE PRODUCTION OF A TRANSPONDER UNIT AND A TRANSPONDER UNIT

FIELD OF THE INVENTION

The present invention relates to a process and a device for the production of a transponder unit comprising a coil and at least one electronic component, such as a chip or the like. The invention further relates to a transponder unit.

BACKGROUND OF THE PRIOR ART

U.S. Pat. No. 5,281,855 has disclosed a transponder unit which is insertable into a glass tube, with a coil which is arranged on a winding carrier and the winding wire ends of which are connected to the terminal surfaces of a chip. The chip is arranged on a substrate which itself is adhesively connected to the end face of the winding carrier.

WO 92/15105 has disclosed a process for the production of a transponder unit comprising a coil and a chip, wherein the component is directly connected to the coil, with a plurality of process stages in which the equipping of a winding tool with the component, winding of the coil in the winding tool, and connection of winding wire ends of the coil to terminal surfaces of the component in the winding tool are carried out. In the known process the winding of the coil takes place in so-called "flyer" processes in which a winding head rotates about the stationary coil.

U.S. Pat. No. 5,025,550 has likewise disclosed a process wherein the coil is wound by means of a "flyer" rotating about the stationary winding carrier. A similar process is also disclosed in NL-A-8 503 166. Further processes for the production of transponders are known from U.S. Pat. No. 5,050,292.

BACKGROUND OF THE INVENTION

For the production of the known transponder unit, the winding wire ends of the previously manufactured coil are connected to the terminal surfaces of the chip. For this purpose the previously manufactured coil must be brought into the position for the subsequent connection of the winding wire ends to the chip terminal surfaces. This necessitates gripping of the winding wire ends during the coil transport and subsequent placing of the winding wire ends onto the chip terminal surfaces for the following connection. As in particular the alignment of the winding wire ends on the terminal surfaces proves extremely difficult due to the micro-dimensions, in the above mentioned patent it is proposed that the terminal surfaces be enlarged in size.

OBJECT OF THE INVENTION

The object of the invention is to propose a process and a device which simplify the production of a transponder unit. It is a further object of the invention to propose a transponder unit in a design which simplifies the production of the transponder unit.

SUMMARY OF THE INVENTION

The process according to the invention for the production of a transponder unit with a coil and at least one electronic component, such as a chip or the like, wherein the component is connected to the coil directly or via a substrate, comprises a plurality of process phases in which the equipping of a winding tool with the component or substrate, winding of the coil in the winding tool, and connection of wire ends of the coil to terminal surfaces of the component or substrate in the winding tool take place in such manner that the winding tool serves as operating platform in all of the aforementioned process phases.

Thus in the process according to the invention both the production of the coil and its subsequent connection to the terminal surfaces of the component or substrate take place in the winding tool. The relative position of the components, which together form the transponder unit, is thus maintained during the whole of the production process. Transfer of the coil to the component or substrate for the establishment of the connection, and the re-positioning which is required due to the transfer, are thus unnecessary in the process according to the invention. This substantially simplifies the production of a transponder unit.

It proves particularly advantageous if, for the production of transponder units, the winding tool is moved in clocked fashion into operating positions assigned to the individual process phases. In this way it is possible for function units assigned to the individual process phases, such as an equipping device and a connecting device, to be permanently installed along the clock path of the winding tool.

If the equipping of the winding tool with the component or substrate takes place before the winding of the coil, during the winding process the winding wire ends can be moved across the terminal surfaces of the component or substrate so that the latter occupy the connecting position from the start.

Alternatively it is also possible to carry out the winding of the coil before the equipping of the winding tool with the component or substrate if this is necessitated due to the special form of the coil.

If the winding tool moves along a circular path into the individual operating positions, and function units for the implementation of the process phases arranged along the circular path and assigned to the individual process phases are moved translationally towards the winding tool, this facilitates a particularly efficient and space-saving implementation of the process.

It proves particularly advantageous if in an equipping position an equipping device is combined with a feed device in such manner that a component or substrate is extracted from the feed device and placed on the winding tool. This facilitates a continuous feed, for example on a translationally clocked, strip-like component- or substrate carrier.

If, in the feed device, the substrate is fed on a continuous substrate carrier to a pick-and-place device serving as equipping device and is extracted from the substrate carrier for example in a punching process, the substrate can be produced directly from the material of the substrate carrier so that, for example, it is possible to use film-like substrate carriers which on the one hand can be made extremely thin and on the other hand can be particularly easily combined with a traction drive when feed perforation is provided.

If, for the implementation of the winding process, in a winding position a winding carrier connected to a winding spindle is inserted into the winding tool in such manner that a connection is established between the winding carrier and the component or substrate, the relative positioning of component/substrate and winding carrier required for the following process phases is automatically adopted when the winding carrier is inserted into the winding tool.

It is particularly advantageous if the connection between the winding carrier and the substrate takes place via a clamping engagement. Here the clamping engagement can either form the final connection between the winding carrier and the substrate or can form a prefixing. The prefixing can be secured via adhesion.

If the transfer of torque from the winding spindle to the winding tool takes place via the winding carrier, it is possible to dispense with a separate transfer of force between the winding spindle, which supplies the winding moment, and the winding tool.

Alternatively, in particular in the event that materials which do not possess the shearing strength required for the torque transfer are used for the winding carrier, it is also possible to transfer the torque from the winding spindle to the winding tool via a coupling element which is independent of the winding carrier.

The device according to the invention for the production of a transponder unit with a coil and at least one electronic component, such as a chip or the like, wherein the component is connected to the coil directly or via a substrate, comprises a base unit with a tool carrier which is rotatable about a central axis of rotation and which can be equipped with at least one winding tool which is moveable on a circular path from an operating position assigned to a winding module (winding position) into an operating position assigned to a connecting module (connecting position), the winding tool serving in the winding position as carrier of a winding matrix and serving in the connecting position as operating platform for the establishment of the electrically conductive connection between the component accommodated by the winding tool and the coil.

The use, according to the invention, of the winding tool both as winding matrix carrier and as operating platform for the establishment of the connection to the component and coil, disposed in a predetermined relative position, substantially simplifies the production of a transponder unit.

In accordance with a preferred embodiment, the device comprises a base unit with interfaces for detachable connection to the winding module and to the connecting module. In this way it is possible to combine one and the same base unit with different modules or to combine different base units with the same modules.

If the base unit comprises a further interface for detachable connection to an equipping module, the above indicated advantages can also be utilized in relation to the further module. The same applies if the base unit is provided with a further interface for detachable connection to an extraction module which facilitates an extraction of the completed transponder unit from the base unit. Another considerable advantage of the modular construction of the device consists in that the winding module, the connecting module, the equipping module and the extracting module are interchangeable in the sequence of their arrangement. In this way it is possible to take into consideration special features of the production process, associated for example with special shapes of the coil. Thus in one case the equipping module can be arranged upstream of the winding module in the process flow whereas in another case the equipping module can be arranged downstream of the winding module in the process flow.

If the winding module comprises a translationally moveable winding spindle with a coupling device for connection to a winding carrier, it is possible for the winding carrier to be inserted into the winding spindle and used as rotary drive for the winding tool.

It is also advantageous if the equipping module comprises a pick-and-place device which can be combined with a substrate- or component feed device.

If the base unit is provided with a plurality of different winding tools, a continuous production of transponder units with different coil shapes is possible.

The transponder unit according to the invention comprising a coil and at least one electronic component, such as a chip or the like, wherein the component is arranged on a substrate and the substrate is connected to the coil, comprises a connection between the substrate and a winding carrier of the coil for the connection of the substrate to the coil.

The connection between the substrate and the winding carrier facilitates a quasi-automatic positioning of the substrate relative to the winding carrier in the event that the individual components are combined to form a transponder unit, so that during the following winding process the winding wire ends can be aligned over the terminal surfaces for the subsequent connection.

If for example the substrate is designed to be fork-shaped in a connecting part for interlocking connection with the winding carrier, an interlocking connection is facilitated without this affecting the height of the substrate. As a result, even extremely thin, film-like substrates can be used.

If the substrate is equipped on both sides in an equipping part, in such manner that an insulating carrier layer of the substrate provided on one side with conductor paths has access openings which allow contacting of the conductor paths on the rear from the opposite side, the available substrate surface can be used particularly effectively.

A further increase in the utilizable substrate surface can be achieved in that on their upper side the conductor paths are equipped via contact surface contacting with a first electronic component and on their opposite side are equipped via wire contacting with a further electronic component. In this way it is possible to arrange the electronic components in an overlap zone on both sides of the substrate.

In the following a preferred variant of the process according to the invention will be explained in more detail in the form of an embodiment of the device according to the invention and an embodiment of the transponder unit according to the invention making reference to the following drawing wherein:

DETAILED DESCRIPTION OF THE INVENTION

Figure 1:
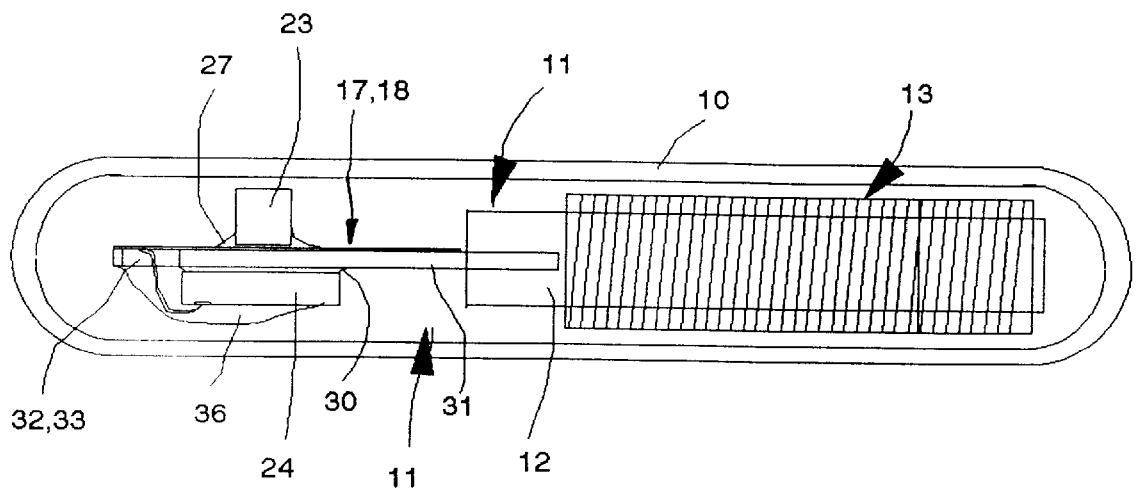
FIG. 1 shows a transponder unit, inserted into a glass body, in a side view.

FIG. 1 illustrates a transponder unit 11 which is sealed into a glass body 10 and is used for example as injection transponder for the coding of animals for slaughter.

The transponder unit 11 comprises a winding carrier 12 which in this exemplary embodiment has the form of a ferrite core and upon which a coil 13 is wound. As can be seen by jointly considering FIGS. 1 and 2, in this exemplary embodiment a substrate 14 is interlockingly connected to the winding carrier 12 via a connecting part 15.

Figure 2:
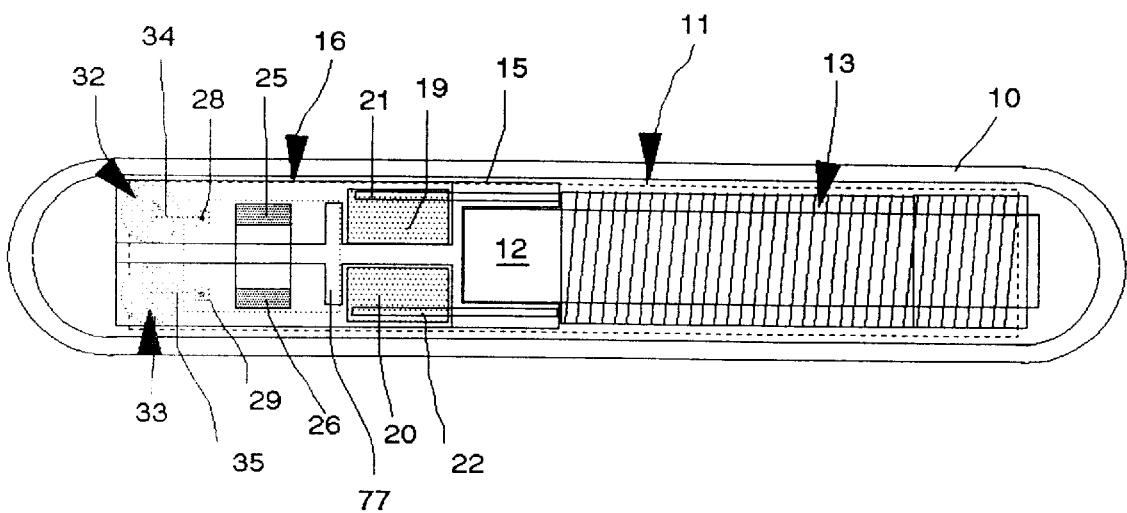
FIG. 2 shows the transponder unit illustrated in FIG. 1 in a plan view.

As can be seen in particular from FIG. 2, in a contacting part 16 the substrate 14 comprises, on its upper side, metallic conductor paths 17, 18 which in a winding wire contact zone 19 or 20 are in each case electrically conductively connected to a winding wire end 21 or 22 of the coil 13.

In this exemplary embodiment the substrate 14 is equipped with a plurality of electronic components, namely a capacitor element 23 on the upper side and a chip 24 on the underside. The capacitor element 23 is electrically conductively connected to the conductor paths 17, 18 by its terminal surfaces 25, 26 via surface contacting together with a connecting means 27 processable by soldering or welding. To prevent disadvantageous cross-influencing between the possibly different connecting materials used for the contacting of the winding wire ends 21, 22 and the capacitor element 23, a flux blocking means 77 is provided between the corresponding contact zones.

For the electrically conductive connection of terminal surfaces 28, 29 of the chip 24, which latter is fixed via an adhesive layer 30 on that surface of an insulating carrier layer 31 of the substrate 14 disposed opposite the conductor paths 17, 18, the carrier layer 31 has two access openings 32, 33 which allow access to the rear of the conductor paths 17, 18 from the opposite side. Via the access openings 32, 33 the conductor paths 17 or 18 are connected by bonding wires 34, 35 to the terminal surfaces 28, 29 of the chip. For the purpose of covering and mechanical stabilisation the chip, together with the bonding wires 34, 35 is cast with a potting compound 36. In the event that only one chip is to be connected to the coil, the terminal surfaces of the chip can be connected directly to the winding wire ends 21, 22 of the coil 13. Then the chip is arranged directly on the winding carrier 12, i.e. without an additional substrate 14.

Figure 3:
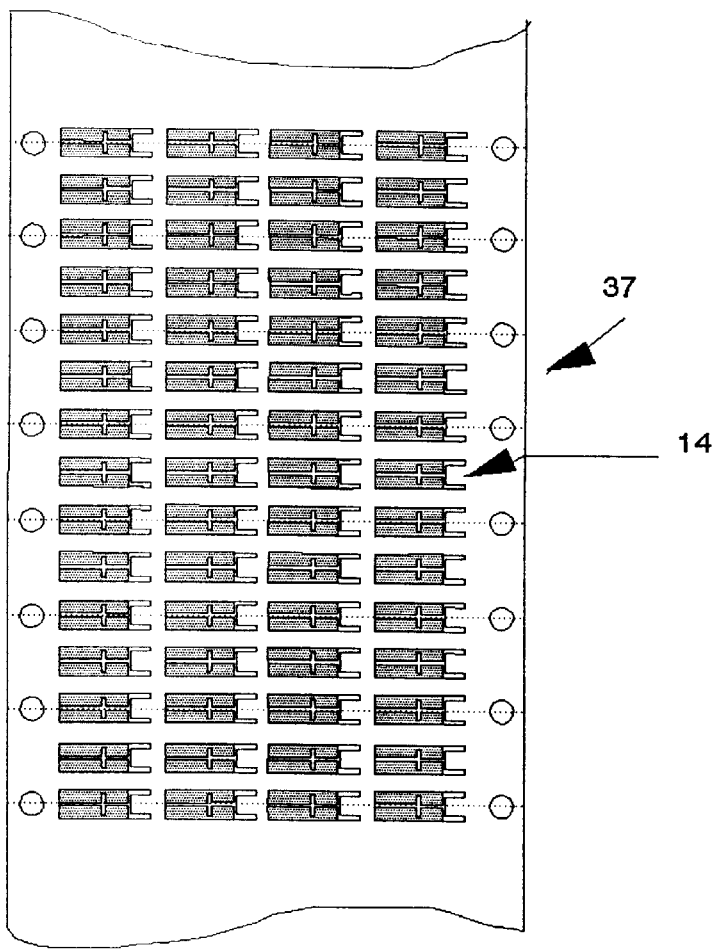
FIG. 3 shows a film-like substrate carrier with substrates formed therein.
Figure 4:
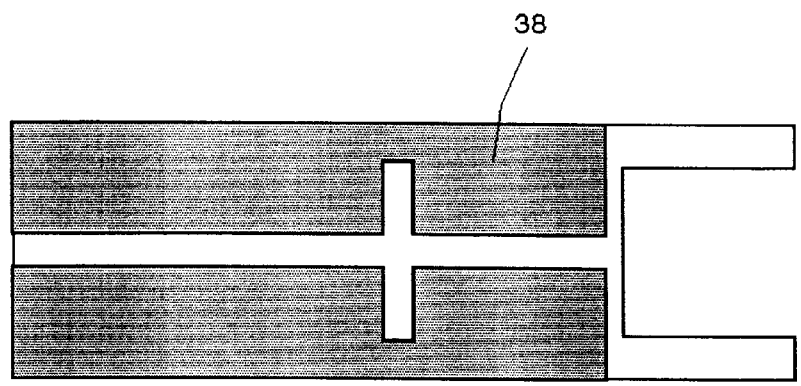
FIG. 4 is an enlarged view of a substrate extracted from the substrate carrier.

As shown in FIG. 3, the substrate 14, equipped with the electronic components here in the form of the capacitor element 23 and chip 24, is made available in large numbers on a film-like substrate carrier 37. The substrate carrier 37 is composed of the material of the carrier layer 31 of the individual substrate 14. For the separation of the substrates 14 and extraction of the substrate 14 in each case required for the production of a transponder unit 11, the substrates 14 can be provided along their outer contour 38 (FIG. 4) with a perforation which allows the individual substrates 14 to be pressed out of the substrate carrier 37. Another possibility of separating the substrates 14 consists in releasing their connection to the substrate carrier 37 by a punching-out process. The two separating measures mentioned as examples in the foregoing can also be performed in combination.

To facilitate the feed of the substrate carrier 37 to a separating station, in the exemplary embodiment illustrated in FIG. 3 a transport perforation 39 is provided at the longitudinal edges of the substrate carrier 37.

Figure 5:
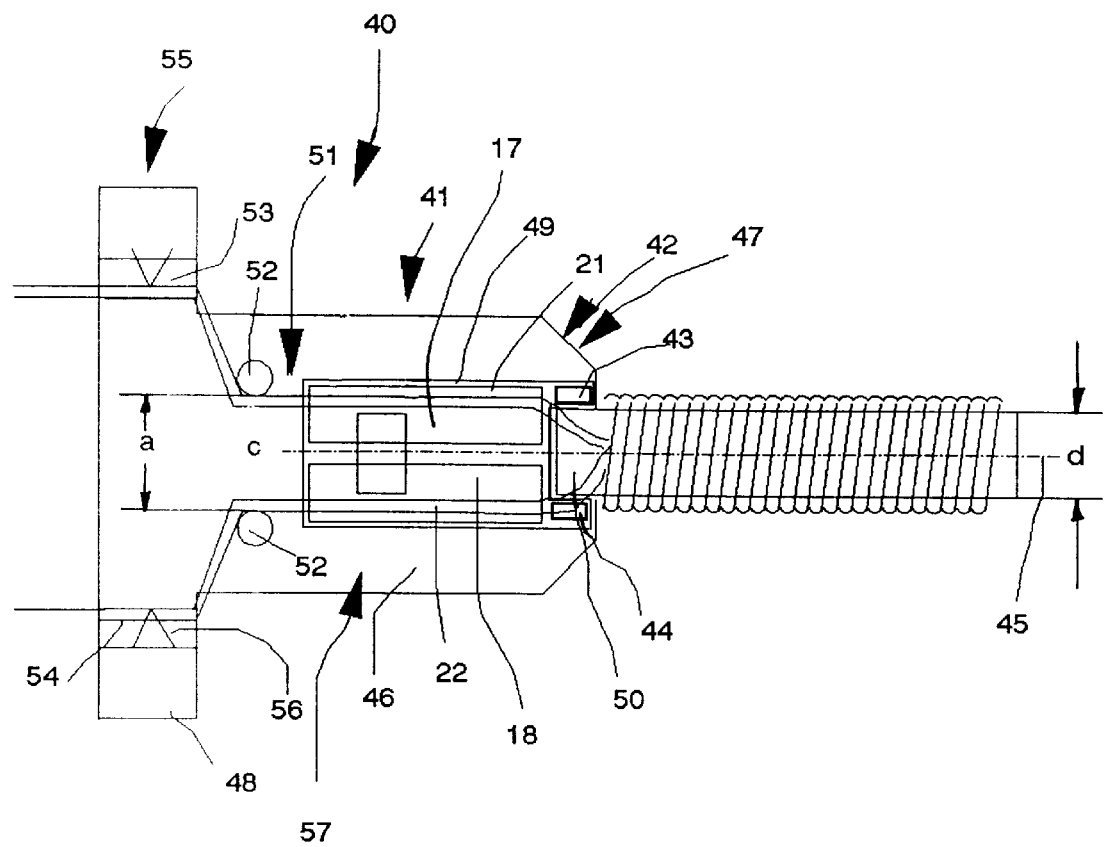
FIG. 5 shows a transponder unit designed in accordance with FIG. 1 during production in a winding tool.

FIG. 5 shows a winding tool 40 for the production of a transponder unit 11, the coil 13 of which is provided with winding wire ends 21, 22 axially projecting from the winding carrier in the exemplary embodiment shown here. The winding tool 40 comprises a matrix carrier 41 which accommodates the winding carrier 12, here serving as winding matrix, in a clamping device 42 having two clamping jaws 43, 44. For the implementation of the winding process the matrix carrier 41 rotates, together with the winding carrier 12, about a winding axis 45.

The matrix carrier 41 is provided on one side with a flattened portion 46, which here is aligned in parallel with the winding axis and extends from a winding carrier holder 47, in which the clamping device 42 is arranged, up to a peripheral edge 48 of the matrix carrier 41 here in the form of a flange.

In the flattened portion 46 there is arranged a substrate holder 49 which allows the substrate 14 to be inserted into the matrix carrier 41 in such manner that when the winding carrier 12 is inserted into the clamping device 42, a connecting end 50 of the winding carrier 12 is gripped by the connecting part 15 of the substrate 14. At least during the establishment of the engagement between the connecting end 50 of the winding carrier 12 and the here fork-shaped connecting part 15 of the substrate 14, the substrate 14 is fixed in the substrate holder 49. This can be effected for example by a vacuum-actuated suction device in the matrix carrier 41.

Arranged on the flattened portion 46 is a wire-deflecting device 51 with two deflecting pins 52, one deflecting pin in each case being assigned to one winding wire end 21, 22 and providing for an alignment of the winding wire ends 21, 22 which is independent of the peripheral position of retaining devices 55, 56 here provided with clamping members 53, 54 as retaining elements.

The actual winding process is performed with the aid of a wire guide (not shown in detail here) which for example has the form of a wire-guiding capillary tube and which guides the winding wire through the first retaining device 55, the winding wire being clamped therein by the clamping member 53. When the wire guide is moved substantially along the winding axis 45, the winding wire is unwound by the wire guide, extending around the first deflecting pin 52 and across the conductor path 17 of the substrate up to the winding carrier 12. The translational movement of the wire guide is then superimposed with a rotational movement of the winding carrier 12 by rotation of the matrix carrier 41 about the winding axis 45 so that the coil 13 illustrated in FIG. 5 forms on the winding carrier 12. When the required number of turns is obtained, the rotational movement of the matrix carrier 41 is halted and the wire guide is moved translationally across the conductor path 18 of the substrate 14 and, following the deflection of the winding wire around the second deflecting pin 52, is guided through the second retaining device 56. For the deflection around the deflecting pins 52, the translational movement of the wire guide is superimposed with a slight rotation of the winding tool 40. Finally the winding wire is clamped again by the clamping member 54. In an overlap zone 57 between the winding wire ends 21, 22 and the conductor paths 17, 18, the diameter d of the winding carrier 12 and the distance a between the deflecting pins 52 predetermine the correct positioning of the winding wire for the subsequent contacting in the winding wire contact zones 19 and 20.

Figure 6:
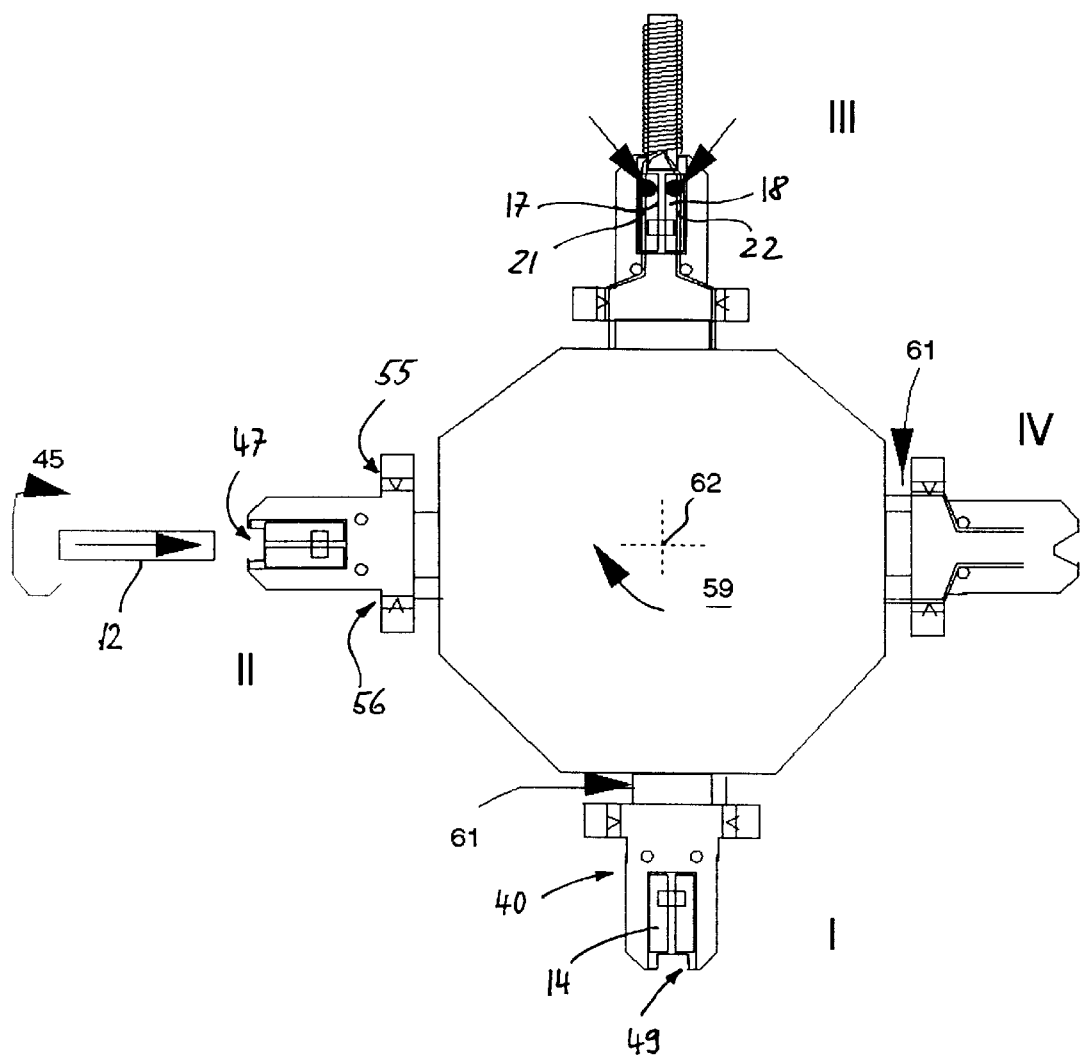
FIG. 6 shows a base unit of a modular device for the production of a transponder unit.
Figure 7:
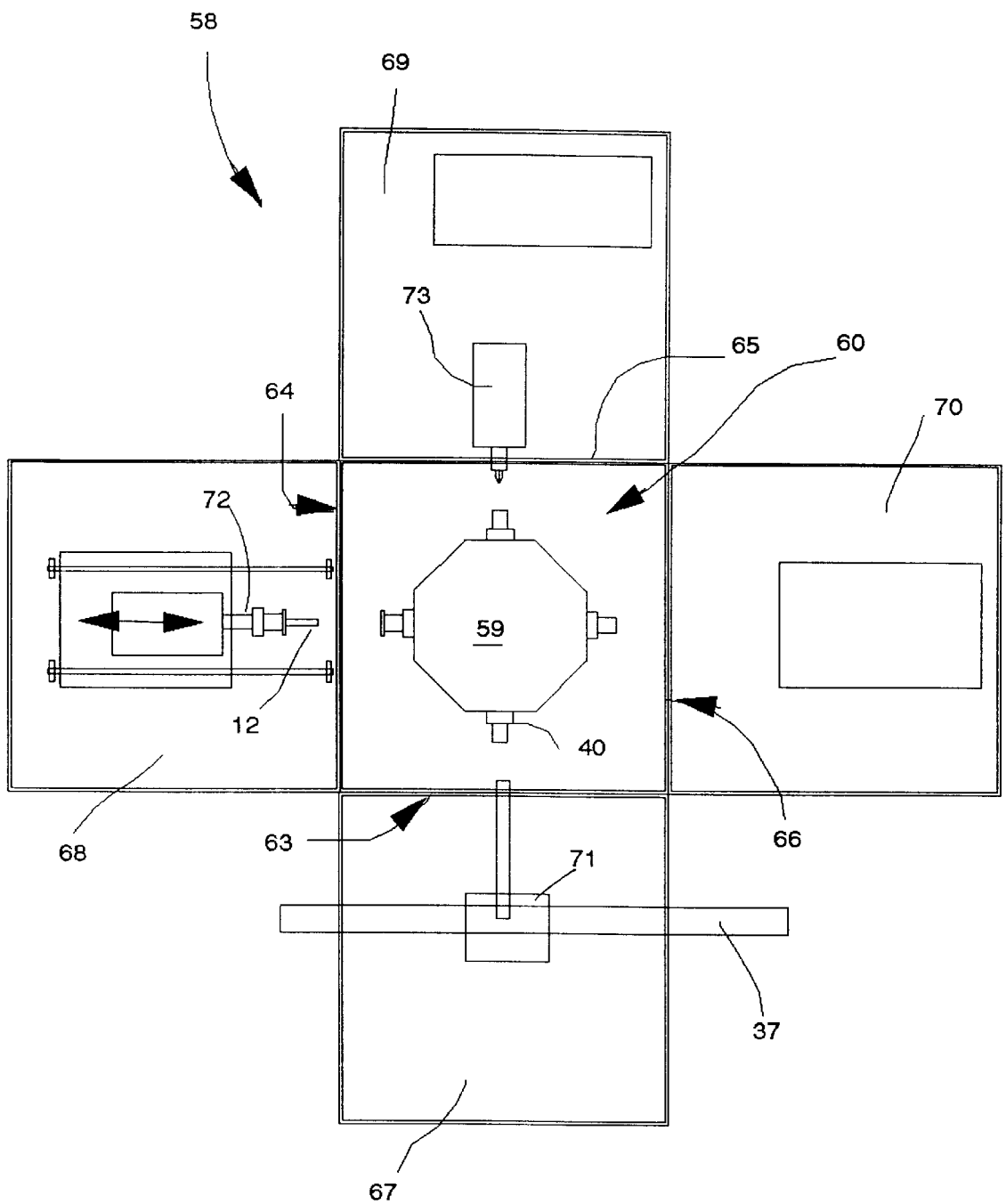
FIG. 7 shows the device for the production of a transponder unit illustrated in FIG. 6 supplemented by modular function units.

A device 58, of which FIG. 6 shows only a tool carrier 59 of a base unit 60 shown in FIG. 7, is used for the production of the transponder unit 11 illustrated in FIGS. 1 and 2.

FIG. 6 illustrates the tool carrier 59 which in the illustrated exemplary embodiment is provided with four tool holders 61. In this exemplary embodiment all the tool holders 61 are equipped with the winding tool 40 shown in FIG. 5. FIG. 6 serves substantially to illustrate the process phases, performed in different operating positions, for the production of the transponder unit shown in FIGS. 1 and 2.

In operating position I the winding tool 40 occupies an equipping position in which the substrate 14 is inserted into the substrate holder 49 of the winding tool 40. By a swivelling movement about an axis of rotation 62 of the tool carrier 59, the winding tool 40 is swivelled into the operating position II in which the winding carrier 12 is inserted into the winding carrier holder 47 of the winding tool 40 and the winding process described with reference to FIG. 5 for the production of the coil 13 takes place. In the winding position an additionally rotary drive of the winding tool 40 about the winding axis 45 takes place.

After the completion of the winding process and the fixing of the winding wire ends 21, 22 in the retaining devices 55, 56 and the severing of the winding wire in the retaining devices, swivelling takes place into operating position III in which the winding wire ends 21, 22 are connected to the conductor paths 17, 18 of the substrate 14.

Finally the winding tool 40 is swivelled into operating position IV in which the completed transponder unit 11 is extracted from the winding tool 40.

FIG. 7 shows the modular construction of the device 58 particularly clearly. The base unit 60, provided with the tool carrier 59, is provided with a number of terminal sides 63, 64, 65, 66 in the form of interfaces to which a corresponding number of device modules 67, 68, 69 and 70 can be mechanically coupled. In the exemplary embodiment shown here a total of four device modules, namely an equipping module 67, a winding module 68, a connecting module 69 and an extracting module 70 are provided.

The equipping module 67 is provided with a feed device (not shown in detail here) which permits a continuous feed of the substrate carrier 37 shown in FIG. 3 to a pick-and-place device 71 which separates the respective substrate 14 from the substrate carrier 37 and places the substrate 14 into the winding tool 40.

The winding module 68 substantially comprises a winding spindle 72 which is provided with a rotary drive and which in the case of the exemplary embodiment shown here simultaneously serves to insert the winding carrier 12 into the winding tool 40. Here the feed of the winding carrier 12 or the continuous feed of winding carriers 12 can be carried out centrally by the winding spindle 72 formed as a hollow shaft. For the transfer of the rotary drive of the winding spindle 72 to the winding tool 40, a torque-resistant coupling takes place between the winding spindle 72 and the winding tool 40. Depending upon the material of the winding carrier 12, the torque coupling can take place directly via said winding carrier or also via a separately provided coupling element. For the translational movement of the winding spindle 72 towards the winding tool 40, the winding spindle is arranged on a slide guide 74.

The connecting module 69 comprises a bonding head 73 which is moved towards the winding wire ends 21, 22 for the connection of the winding wire ends 21, 22 to the conductor paths 17 or 18 of the substrate 14.

A pick-and-place device (not shown in detail here) can be used for the extraction module 70, which pick-and-place device extracts the completed transponder unit 11 from the winding tool 40 and feeds it to a depositing- or further processing stage.

The base unit 60 illustrated in FIG. 7 comprises terminal sides 63 to 66 with standard modular dimensions so that the device modules 67 to 70 can be regrouped in arbitrary manner if this is necessary due to the design of the particular transponder unit to be produced.

Figure 8:
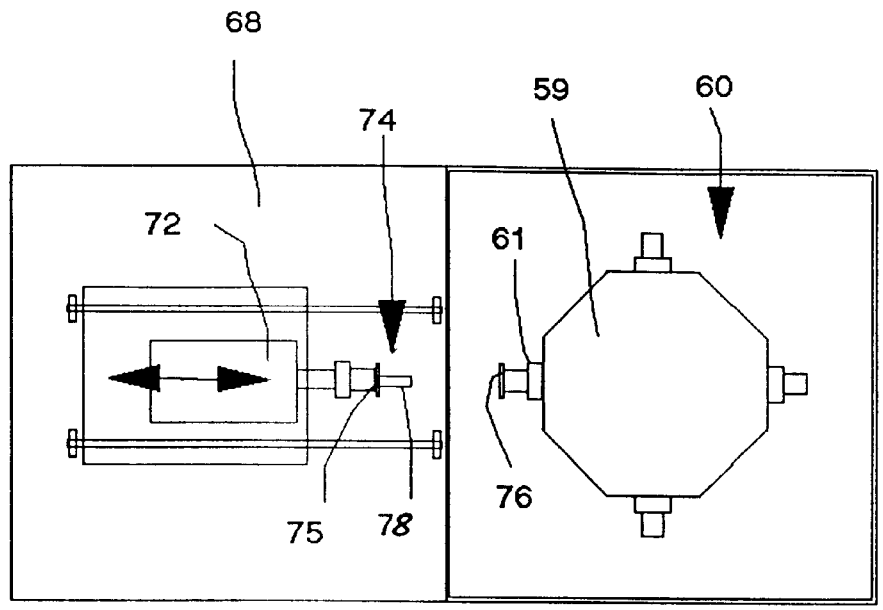
FIG. 8 shows the base unit, supplemented by a spindle drive module, with decoupled spindle drive.
Figure 9:
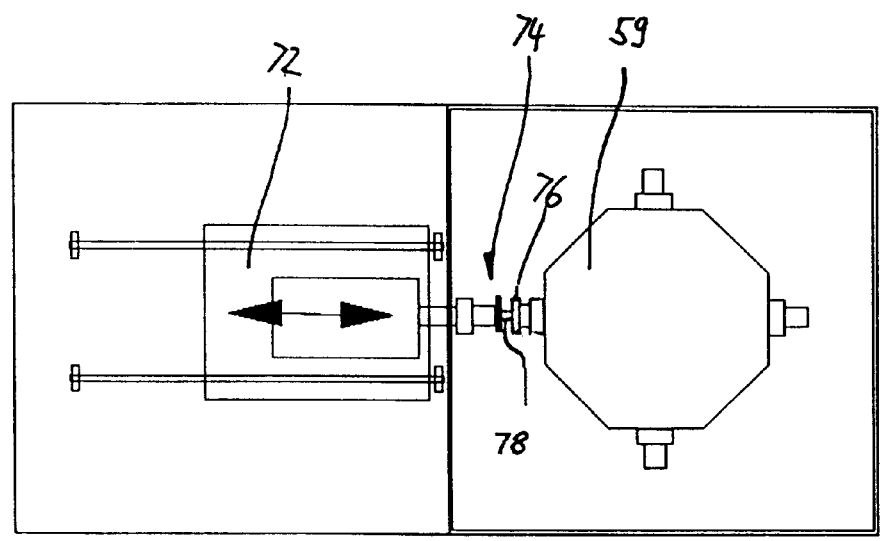
FIG. 9 shows the device illustrated in FIG. 8 with coupled spindle drive.

FIGS. 8 and 9 show the device 58 in a basic configuration comprising a base unit 60 and a winding module 68. The exemplary embodiment illustrated in FIGS. 8 and 9 schematically illustrate a substantially two-part winding tool 74 comprising two matrix parts 75, 76 which together form the winding tool 74. Here one matrix part 75 is assigned to the winding spindle 72 and the other matrix part 76 is assigned to the tool holder 61 of the tool carrier 59. The matrix part 75 comprises a winding core 77 which engages into the matrix part 75 for the torque transfer (FIG. 9). In contrast to the exemplary embodiment of the winding tool 40 shown in FIG. 5, in which the winding carrier 12 is also fed as continuous rod material by the winding spindle 72 to the winding tool 40 and is cut to the length illustrated in FIG. 5 only upon the termination of the winding process, the winding tool 74 shown in FIGS. 8 and 9 is particularly suitable for the production of ring-shaped air-core coils.

What is claimed is:

1. A transponder unit comprising s substrate;

a coil including a winding carrier having a plurality of coil windings;

at least one chip; and the chip is arranged on the substrate;

the substrate is affixed to the winding carrier of the coil;

the winding carrier having the plurality of coil windings is elongated and extending away from the substrate; and the substrate is fork-shaped having an open end, wherein the open end terminates in a connector and forms an interlocking connection with the winding carrier.

2. The transponder unit according to claim 1, further comprising at least two electronic components;

the substrate comprises a first side and a second side, the first side includes an insulating carrier layer the second side includes two conductor paths;

one of the at least two electronic components is disposed on the insulating carrier layer;

the second of the at least two electronic components is disposed on the second side; and the insulating carrier layer includes at least one access opening to the second side for connecting the electronic component disposed on the first side of the insulating carrier layer to the conductor paths disposed on the second side.

3. The transponder unit according to claim 2, wherein the second of the at least two electronic components, disposed on the second side, has a surface contact side, the surface contact side is connected to the two conductor paths;

the second of the at least two electronic components is connected to the two conductor paths via conductive wires.

* * * * *